United States Patent [19]
Crowley et al.

[11] Patent Number: 5,711,014
[45] Date of Patent: *Jan. 20, 1998

[54] ANTENNA TRANSMISSION COUPLING ARRANGEMENT

[76] Inventors: Robert J. Crowley, 64 Puritan La., Sudbury, Mass. 01776; Donald N. Halgren, 35 Central St., Manchester, Mass. 01944

[*] Notice: The term of this patent shall not extend beyond the expiration date of Pat. No. 5,493,702.

[21] Appl. No.: 581,065

[22] Filed: Dec. 29, 1995

Related U.S. Application Data

[63] Continuation-in-part of Ser. No. 42,879, Apr. 5, 1993, Pat. No. 5,493,702.
[51] Int. Cl.$^6$ ............................................. H04B 1/38
[52] U.S. Cl. .......................... 455/575; 455/90; 343/841
[58] Field of Search ........................... 455/89, 90, 117, 455/128, 129, 325, 345, 575; 379/437, 451, 446, 455, 58, 59; 343/702, 703, 720, 841; 361/814; 102/393

[56] References Cited

U.S. PATENT DOCUMENTS

| | | |
|---|---|---|
| 2,790,899 | 4/1957 | Townsend . |
| 3,099,807 | 7/1963 | Oh . |
| 3,364,487 | 1/1968 | Maheux . |
| 3,518,681 | 6/1970 | Kiepe . |
| 3,636,912 | 1/1972 | Kamp . |
| 3,826,935 | 7/1974 | Grierson et al. . |
| 4,167,738 | 9/1979 | Kirkendall . |
| 4,193,076 | 3/1980 | Ito et al. . |
| 4,220,955 | 9/1980 | Frye . |
| 4,481,647 | 11/1984 | Gombert et al. . |
| 4,724,766 | 2/1988 | LaBudde ................. 102/393 |
| 5,016,020 | 5/1991 | Simpson . |
| 5,020,149 | 5/1991 | Hemmie ................. 455/325 |
| 5,161,255 | 11/1992 | Tsuchiya ................. 455/345 |
| 5,170,173 | 12/1992 | Krenz et al. ............. 455/89 |
| 5,243,355 | 9/1993 | Emmert et al. . |
| 5,335,366 | 8/1994 | Daniels ................... 455/89 |
| 5,493,702 | 2/1996 | Crowley et al. ......... 455/89 |

*Primary Examiner*—Reinhard J. Eisenzopf
*Assistant Examiner*—Thanh Le
*Attorney, Agent, or Firm*—Don Halgren

[57] ABSTRACT

The present invention comprises a docking system for connecting a portable communication device to a further signal transmission line. The portable communication device has an external radiative antenna. The docking system for the portable communication device comprises a shielded housing for receivably enclosing at least a portion of the external radiative antenna of the portable communication device. A coupling probe is mounted within the shielded housing for radiatively coupling the external antenna of the portable communication device and the further signal transmission line via radio frequency energy therebetween.

28 Claims, 2 Drawing Sheets

ANTENNA TRANSMISSION COUPLING ARRANGEMENT

BACKGROUND OF THE INVENTION

(1) Field of the Invention

This invention relates to a docking system for handheld electronic devices such as cellular telephones or the like, for structures or vehicles, and is a Continuation-In-Part Application of our allowed U.S. patent application Ser. No. 08/042,879, filed Apr. 5 1993, U.S. Pat. No. 5,493,702, and incorporated herein by reference, in its entirety.

(2) Prior Art

Extraneous radio frequency emission has become a serious concern of hand-held electronic communication devices such as portable facsimile machines, ground position indicators, and cellular telephone manufacturers and users alike. RF radiation is considered a potential carcinogen.

The proliferation of these hand-held devices is evident everywhere. Hand held devices however, should be usable in automobiles, planes, cabs or buildings without causing concern of the radiation therefrom. The hand-held devices should be portable for a user to carry in his pocket, yet be able to use that same cellular unit in such vehicle or building while minimizing such radiational effect therein.

It is an object of the present invention to permit a user of a portable hand-held electronic communication device such as a cellular telephone or the like, to conveniently use that same hand-held device/cellular phone in an automobile, plane or building, or anywhere transmission is needed.

It is a further object of the present invention to minimize any radiation from such a hand-held device, such as a cellular telephone, while such use occurs in an automobile, a building or an elevator, an airplane, a cab, or other public facility in which the user wishes to minimize his exposure to stray radiation, to permit re-transmission, to avoid the necessity of connecting and deconnecting cables and to permit a wide variety of cellular telephones such as would be utilized in a rental car where various manufactures' phones would be used; and to avoid repeated reuse of coaxial connections that would otherwise be subject to wear, dirt and poor connections so as to be the source of undesired RF leakage.

BRIEF SUMMARY OF THE INVENTION

The present invention comprises a docking system adaptable to an automobile, plane or building for receipt of and cradling of a hand-held electronic device such as a cellular telephone, to permit a mating of the antenna of the cellular telephone, with an emissive free receiver, to direct the signal through a coax cable and a further outside antenna.

The docking system includes a housing which also captures the hand-held cellular telephone. The housing may include a contact arrangement to charge the hand-held cellular telephone batteries during its cradling within the vehicle or building.

The housing comprises a metal case, such as aluminum or a conductive plastic which matively receives the antenna and the telephone unit itself. The housing comprises a separate compartment for the antenna and for the telephone. The antenna compartment may be brass lined on its inner surface with a silver plating thereon. A broadband coupling probe is arranged adjacent the antenna within the antenna compartment. A ferrite attenuator may be arranged between the antenna compartment and telephone compartment of the housing. A metallic backplate may be arranged to capacitively couple the telephone chassis to an RF ground.

A coupling probe may be attached, through a proper coaxial cable, to an external antenna, in the vehicle or building, as the case may be.

It is an object of the present invention to provide a shielded antenna docking arrangement for using a portable hand held telephone in a vehicle such as a plane, an automobile or a cab or in a public or private building or elevator.

It is a further object of the present invention to provide an efficient low cost quick coupling of a hand held portable telephone to use in an automobile, building or plane while providing an improved range for use of that telephone.

It is yet a further object of the present invention to provide a system which permits the shielded use of a hand held (cellular) telephone, while also providing a recharging of the batteries of that hand held telephone.

The invention thus includes an arrangement for permitting the safe, shielded use of a hand-held electronic device such as a cellular telephone in a structure comprising: a conductive housing having an antenna compartment; a partition separating the antenna compartment from the telephone; an antenna adapter arranged to transfer signals with respect to an antenna of the cellular telephone and an external antenna therewith.

The invention also includes the antenna compartment with an RF lining shield arranged therein. The RF lining may comprise a silver-plated brass shield. The separator partition may comprise a ferrite attenuator. The invention may include a means for charging the cellular telephone while it is disposed within the housing. The housing may be connected to a remote loudspeaker and microphone, to permit a cellular hand-held telephone to be operated "hand-free" therewith. The structure may be an automobile, a building, an airplane, or an elevator. The invention includes a method for permitting the safe, shielded use of a hand-held cellular telephone in a structure, comprising the steps of: providing a conductive housing for enclosure of an antenna and a cellular telephone therewith; empowering the housing with a support circuit to permit use of such a cellular telephone therewith; shielding the antenna within the conductive housing so as to contain RF signals therewithin; transmitting signals between an external antenna and an antenna enclosed within the conductive housing; resonating said conductive housing near the operating frequency of the telephone; coupling transmitted and received RF energy through the antenna to an external transmission line and antenna external of the structure.

The invention includes a method for permitting the safe, shielded use of a hand held electronic device such as a cellular telephone having a short antenna thereon, in a structure, comprising the steps of: providing a conductive housing arranged to radiationally enclose the short external antenna of a hand held cellular telephone; connecting the conductive housing through an RF transmission line and connector, to an antenna external of the structure; resonating the conductive housing near the operating frequency of the hand held cellular telephone; coupling transmitted and received RF energy from the short antenna through the antenna external of the structure.

The invention thus comprises a docking system for connecting a portable communication device to a further signal transmission line, the portable communication device having an external radiative antenna, the system comprising a shielded housing for receivably enclosing at least a portion of the external radiative antenna of the portable communication device; and a coupling probe mounted within the shielded housing for radiatively coupling between the external antenna of the portable communication device and the further signal transmission line via radio frequency energy therebetween. The shielded housing is comprised of an electrically conductive material. A radio frequency absorbent material is arranged within the shielded housing. The radio frequency absorbent material is ferrite. The signal transmission line comprises a further antenna located at a location remote from the shielded housing. The shielded housing is articulable with respect to the further antenna. The signal transmission line comprises a coaxial electrical cable. The portable communication device is a cellular telephone. The shielded housing is articulably attached to a support structure, to permit adjustability with respect thereto.

The invention also comprises a method of coupling a portable communication device having an external radiative antenna, to a signal transmission line for the purpose of effecting radio signal transmission therebetween, the method comprising the steps of arranging a shielded housing in attachment with the signal transmission line, mounting a coupling probe within the shielded housing and in communication with the signal transmission line, and inserting the external antenna of the portable communication device into the shielded housing so as to permit radiative communication between the radiative antenna and the signal transmission line via the coupling probe. The method includes the steps of attaching a further antenna to the signal transmission line at a location remote from the shielded housing, energizing said portable communication device so as to effectuate radiative transmission between the external radiative antenna of the portable communication device, and the coupling probe attached to the signal transmission line, arranging the signal transmission line in a structure; and articulating the shielded housing with respect to the structure to facilitate mating of the external antenna with respect to the shielded housing.

The invention also includes a system for coupling a cellular telephone having an external radiative antenna, to a separate signal transmission line, the system comprising a shielded housing arranged to confiningly contain radio frequency energy, and a coupling probe mounted within the housing, which probe is also in electrical communication with the signal transmission line, the coupling probe arranged to radiatively transfer radio frequency energy between an external radiative antenna of a cellular telephone placed a spaced distance thereadjacent, and the signal transmission line, to effectuate coupling thereof when the cellular telephone is energized. The signal transmission line also comprises a further radiative antenna disposed remotely with respect to the shielded housing.

BRIEF DESCRIPTION OF THE DRAWINGS

The objects and advantages of the present invention will become more apparent when viewed in conjunction with the following drawings in which.

DESCRIPTION OF THE PREFERRED EMBODIMENTS

Figure 1:
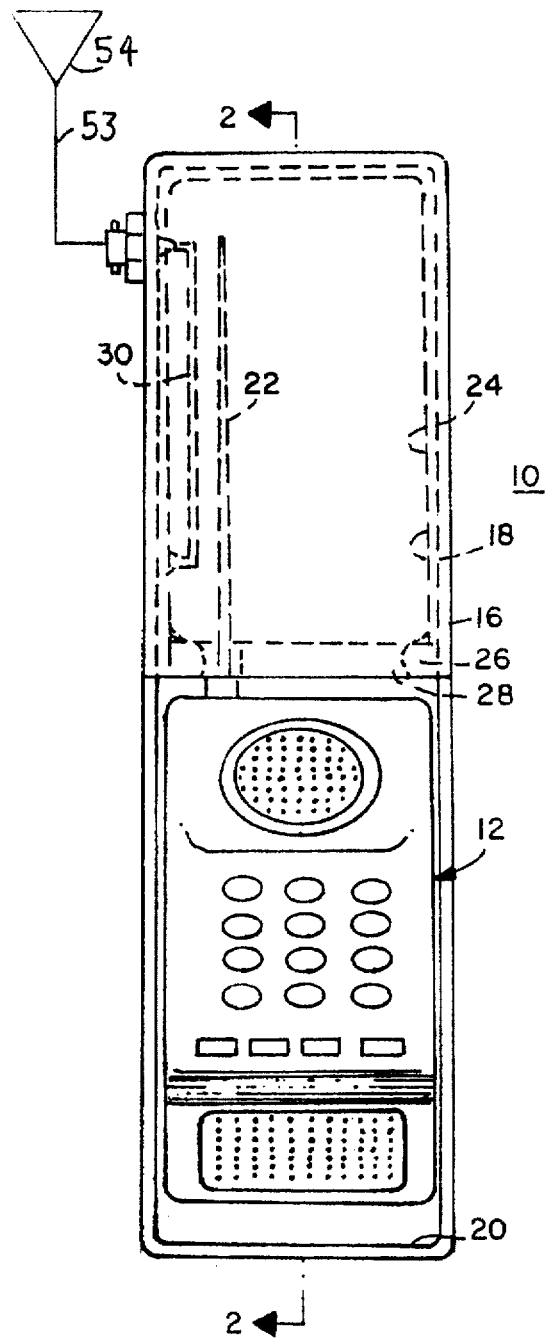
FIG. 1 is a plan view of a telephone docking housing arrangement, with portions omitted for clarity.

Referring now to the drawings in detail, and particularly to FIG. 1, there is shown a portable communication device docking arrangement 10, to permit a portable communication device such as a hand-held cellular telephone 12 to be utilized anywhere, such as within a vehicle or structure or adjacent thereto, and as a personal communicator (telephone) carried on an individual.

The docking arrangement 10 comprises a housing 16, fabricated typically from a metal, such as aluminum, or from a conductively coated plastic, such as a polycarbonate. The docking arrangement includes the housing 16 which may be divided into an antenna receiving compartment 18, and a cellular telephone receiving compartment 20. The antenna receiving compartment 18, is more fully resonant at the frequency range of about 860 MHz, and fully encloses an antenna 22 received therein, to provide RF shielding therefrom. The antenna compartment 18 may have silver plated brass 24 lining the inner walls thereof, as shown in FIG. 1. The antenna compartment 18, preferably has interior dimensions of about 4.5 cm by about 1.9 cm by about 12.38 cm, or other dimensions which provides a rough equivalent volume in the antenna compartment 18, as the aforementioned dimensions. This produces a fundamental resonant frequency of about 286 MHz and will operate efficiently at about 860 MHz which is the third harmonic frequency and provides a cavity large enough to accommodate most cellular telephone antennas. It is adaptable to other frequencies that 860 MHz, from the VHF region to the microwave region through dimensional changes in the antenna compartment 18. An antenna piercable wall structure for segregating the antenna compartment 18 from the user, may preferably be comprised of a ferrite attenuator 26, or partition, which acts as a choke between the antenna compartment 18 and the user and telephone compartment 20, to prevent the emission from the antenna compartment 18, of stray RF energy, or at least lower it to an acceptable level. An opening 28 is disposed within the ferrite attenuator 26, to permit an antenna 22 to be disposed within the compartment 18.

Figure 3:
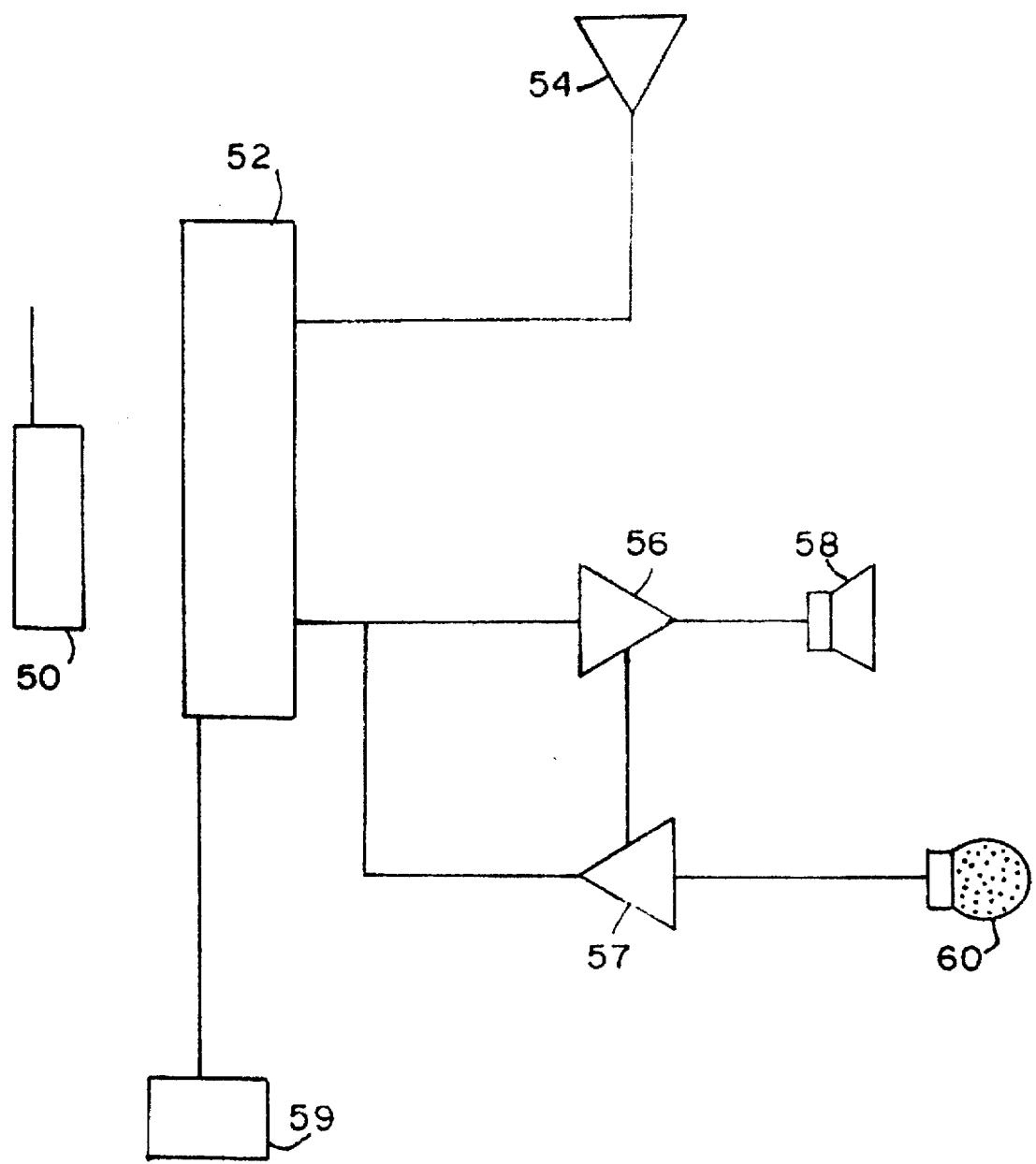
FIG. 3 is a block diagram of a docking system for a handheld cellular telephone.

A broadband coupling probe 30 is arranged within the antenna compartment 18, and is connected, through appropriate coax cable 53 to an external antenna 54, (vehicle structure) as also shown in FIG. 3, in block diagram form. The coupling probe is tuned to a central resonant frequency of about 860 MHz,, with a nominal 50 ohm load at the terminal. The probe 30 may also be comprised of an ungrounded capacitive coupling probe or plate, which serves the same function as the inductive probe. Other couplings 30 may include radiation couplings and galvanic couplings which are arrangeable in close proximity to the antenna 22, for transmission to and from the external antenna 54.

Figure 2:
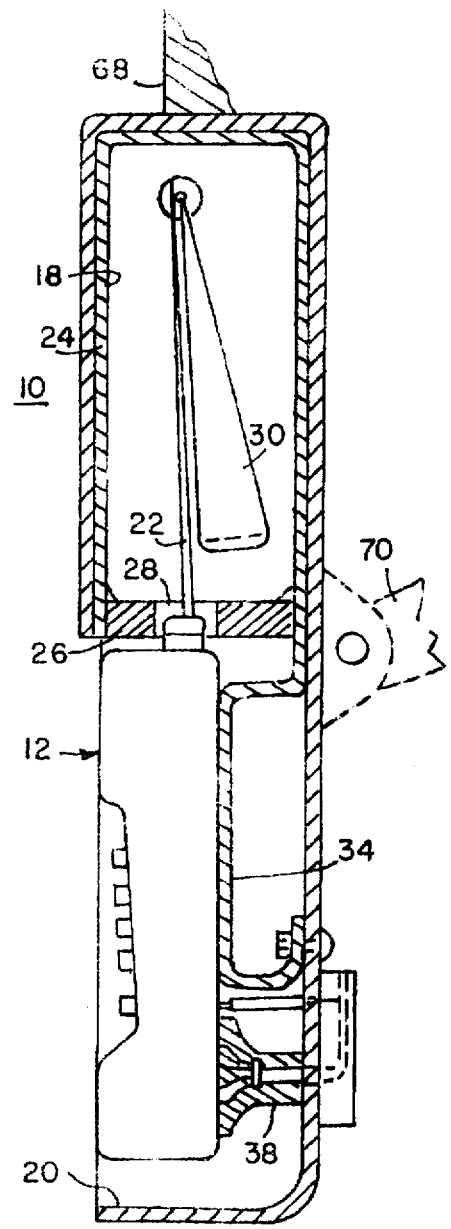
FIG. 2 is a view taken along the lines A—A of FIG. 1.

The telephone 12 is arranged to be snugly received within the telephone compartment 20, as shown in FIGS. 1 and 2. The compartment 20, may have a capacitive ground backing plate 34, made of aluminum, in conductive communication with the housing 16. The housing 16, is of course attached to an RF ground connector 36, such RF ground being carried to the ground side of the connector.

The telephone compartment 20 may have a biased charger pin arrangement 38, which is in connective communication with the electrical system of the structure (vehicle, building or airplane), to permit the hand-held cellular telephone 12 to be charged while it is emplaced within the docking arrangement 10.

The block diagram of the docking arrangement 10, is shown in FIG. 3, wherein a hand held cellular telephone unit 50 is placed in antenna mating relationship with a coupling probe of a cellular phone dock 52. The dock 52 is attached for example, to an external (automobile) antenna 54. It is to be noted that the dock 52 could be disposed in the wall of a building, or in an elevator, an airplane, or just about anywhere an external antenna may be arranged to pickup RF signals and keep them from close proximity to a person who is using the hand held cellular unit. The dock may be actually built into a wall 68 of the entity using the dock 52, or it may be on an articulable arm 70, so as to bring the dock 52 within adjustable reach of people. The dock 52, in any case, may be attached to an audio output amplifier 56 which feeds a signal to a loudspeaker 58, when it is set up in a vehicle. A remote mounted microphone 60 is connected to a microphone null amplifier 57 and the output amplifier 56, to permit hands-free operation of a telephone 50 while using this docking arrangement 10 in an automobile (or other aforementioned facility) without acoustic feedback.

The telephone unit 50 is charged through a 12.8 volt regulator 59, which picks up power through the electrical system of the structure automobile, building or airplane), to which the docking arrangement 10 is attached. The unit permits efficient, inexpensive and convenient means for holding and operating a handheld cellular telephone within a vehicle, airplane or building, while effectively shielding the occupants from potentially harmful RF energy.

We claim:

1. A docking system for capacitively connecting a portable communication device having an externally radiative antenna, to a further signal transmission line for effecting radio signal transmission therebetween, said system comprising:

a housing comprising an open section for receiving said portable communication device; said housing including an RF capacitive coupling element in a separate shielding enclosure segregated from said open section of said housing, and connected to said further signal transmission line;

said separate shielding enclosure holding said RF coupling element offset and to one side of said externally radiative antenna of said portable communication device so as to permit radiative communication to said further signal transmission line via radio frequency energy therebetween.

2. The docking system as recited in claim 1, wherein said separate shielding enclosure includes an electrically conductive material.

3. The docking system as recited in claim 1, wherein a radio frequency absorbent material is arranged within said shielding enclosure.

4. The docking system as recited in claim 3, wherein said radio frequency absorbent material is ferrite.

5. The docking system as recited in claim 1 wherein said further signal transmission line comprises a further antenna located at a location remote from said shielding enclosure.

6. The docking system as recited in claim 5, wherein said shielding enclosure is articulable with respect to said further antenna.

7. The docking system as recited in claim 5, wherein said further signal transmission line comprises a coaxial electrical cable.

8. The docking system as recited in claim 5, wherein said portable communication device is a cellular telephone.

9. The docking system as recited in claim 5, wherein said shielding enclosure is attached to a support structure.

10. A method of capacitively coupling a portable communication device having an externally radiative antenna, to a signal transmission line for the purpose of effecting radio signal transmission therebetween, said method comprising the steps of:

arranging a housing including an open section for receipt of said portable communication device, said housing including an RF coupling element in a separate shielding enclosure segregated from said open section of said housing and connected to said signal transmission line;

mounting said coupling element in said separate shielding enclosure offset and to one side of said external radiative antenna when said portable communication device is placed at said open section of said housing; and placing said externally radiative antenna of said portable communication device offset and to one side of said RF coupling element in said separate shielding enclosure so as to permit capacitive radiative communication between said externally radiative antenna of said portable communication device and said signal transmission line via said coupling element.

11. The method of coupling the portable communication device to the signal transmission line, as recited in claim 10, including the step of:

attaching a further antenna to said signal transmission line at a location remote from said housing.

12. The method of capacitively coupling the portable communication device to the signal transmission line, as recited in claim 11, including the step of:

energizing said portable communication device so as to effectuate capacitive transmission between said externally radiative antenna of said portable communication device, and said coupling plate attached to said signal transmission line.

13. The method of coupling the portable communication device to the signal transmission line, as recited in claim 12, including the steps of:

arranging said signal transmission line in a structure; and articulating said shielding enclosure with respect to said structure to facilitate mating of said externally radiative antenna with respect to said shielding enclosure.

14. The method of coupling the portable communication device to the signal transmission line as recited in claim 13, wherein said portable communication device comprises a cellular telephone.

15. A system for capacitively coupling a communication device having an externally radiative antenna, to a separate signal transmission line, said system comprising:

a housing having an open section for receiving said communication device, said housing also having a shielded enclosure arranged to confine a coupling plate mounted within said shielded enclosure, which plate is also in electrical communication with said separate signal transmission line;

said coupling plate arranged to radiatively transfer radio frequency energy between an externally radiative antenna of said communication device placed a spaced distance outside of said enclosure and said separate signal transmission line, said externally radiative antenna arranged offset and to one side of said coupling plate in said shielded enclosure section, to effectuate capacitive coupling thereof when said communication device is energized.

16. The coupling system as recited in claim 15, wherein said separate signal transmission line also comprises a further radiative antenna disposed remotely with respect to said shielded enclosure.

17. A signal transmission system for the convenient radiative coupling of an electronic communication device having an externally radiative antenna, to a separate signal transmission line connected therewith, said system comprising:

a radiative coupling element connected in communication with said separate signal transmission line, said coupling element comprising an ungrounded capacitive coupling probe or plate;

a housing structure having an open section, arranged for receipt of said electronic communication devices, said housing including said radiative coupling element arranged in a separate shielding enclosure segregated from said open section of said housing and connected to said signal transmission line, said external radiative antenna of said portable electronic communication device being arranged offset and to one side of said ungrounded capacitive coupling plate or probe, to permit capacitive coupling between said externally radiative antenna of said portable communication device and said ungrounded capacitive coupling probe or plate for subsequent electronic transmission with respect to said separate signal transmission line.

18. The system as recited in claim 17, wherein said transmission line is comprised of a coaxial cable.

19. The system as recited in claim 17, wherein said externally radiative antenna and said coupling element are disposed in a generally parallel relationship.

20. The system as recited in claim 17, wherein said housing structure at least partially encloses said externally radiative antenna of the electronic communication device arranged therewith.

21. The system as recited in claim 17, wherein said housing structure includes an electrically conductive material.

22. The system as recited in claim 17, wherein said ungrounded coupling probe or plate is supported in a shielded arrangement with respect to said housing structure.

23. The system as recited in claim 17, wherein at least a portion of said housing structure is tuned for resonant operation.

24. The system as recited in claim 17, wherein said signal transmission line includes a further antenna.

25. The system as recited in claim 17, wherein said electronic communication device comprises a cellular telephone.

26. The system as recited in claim 17, wherein said housing structure is articulable with respect to said signal transmission line.

27. The system as recited in claim 17, wherein said radiative coupling element includes a empowering circuit electronically connected therewith.

28. The system as recited in claim 17, wherein said housing structure comprises an enclosure to at least partially enclose a portion of the externally radiative antenna of said electronic communication device, and an open section in which to receive said communication device.

* * * * *